(12) United States Patent
Marten

(10) Patent No.: US 6,175,359 B1
(45) Date of Patent: *Jan. 16, 2001

(54) POINTING DEVICE WITH REDUCED COMPONENT COUNT

(75) Inventor: Victor Marten, Flushing, NY (US)

(73) Assignee: USAR Systems, Inc., New York, NY (US)

( * ) Notice: Under 35 U.S.C. 154(b), the term of this patent shall be extended for 0 days.

This patent is subject to a terminal disclaimer.

(21) Appl. No.: 09/157,739

(22) Filed: Sep. 21, 1998

Related U.S. Application Data

(62) Division of application No. 08/708,048, filed on Aug. 30, 1996, now Pat. No. 5,874,938.

(51) Int. Cl.⁷ .................................................. G09G 5/08
(52) U.S. Cl. ..................... 345/161; 345/157; 345/158; 345/168
(58) Field of Search ................................. 345/156, 157, 345/158–161, 168

(56) References Cited

U.S. PATENT DOCUMENTS 5,874,938 * 2/1999 Marten ................................. 345/156

* cited by examiner

Primary Examiner—Richard A. Hjerpe
Assistant Examiner—Kimnhung Nguyen
(74) Attorney, Agent, or Firm—Oppedahl & Larson LLP

(57) ABSTRACT

A signal processing system for a strain-gauge pointing device has a reduced parts count and permits the use of relatively inexpensive low-tolerance components. The system can process signals from two or three or more strain gauges, permitting additional inputs by users without a linear increase in the number of signal processing components. The system employs an RC network to develop an offset for the signal to be provided to an analog-to-digital converter. The system performs each measurement twice, once with a particular excitation polarity and again with the opposite excitation polarity, which permits correction for drift and temperature instability.

4 Claims, 4 Drawing Sheets

POINTING DEVICE WITH REDUCED COMPONENT COUNT

This is a divisional of Ser. No. 08/708,048, filed Aug. 30, 1996, now U.S. Pat. No. 5,874,938 which is herein incorporated by reference.

The invention relates generally to user input devices for personal computers, and relates more specifically to a sensitive and accurate signal processing path for a small-signal strain-gauge user pointing device having low power consumption and reduced component count. The signal processing path offers its benefits in many other data acquisition applications, however, including systems using strain gauge sensors.

BACKGROUND OF THE INVENTION

The first decades of the computer revolution were focused on the processor. Now that processors are arbitrarily small, arbitrarily fast, and inexpensive, it has become possible to make a shift away from a world containing a small number of large, line-powered non-mobile computer systems, to a world in which lots of people have computers and the computers are small, portable, and battery powered. Graphical user interfaces are now common, representing a shift in the user interface away from the character-oriented user input devices and displays of the past. But at the same time that graphical user interfaces have become commonplace, the personal computer has also been shrinking. Formerly the size of the processor and associated electronics was so great that there was little reason to try to miniaturize anything else. Nowadays the designer of a personal computer faces a design environment in which the processor is quite small, and the limiting factors for package size are the dimensions of the screen, the keyboard and pointing device, and the battery. The screen, keyboard, and battery have yielded to the engineers' energies to the extent possible at the present time, leaving the pointing device as one of the few remaining targets of miniaturization efforts. The classic track ball and mouse have too many moving parts and are too bulky for today's smallest computers, leaving the force-sensitive joystick as a very popular pointing device for user input.

The force-sensitive joystick presents itself to the consumer as a resilient button in the lower center of the keyboard, looking much like a pencil eraser. The button (60 in FIG. 1) connects to a small strain gauge 61 that is hidden from the view of the consumer. In a typical prior-art embodiment the strain gauge 61 is a four-wire device as shown in FIG. 1, defined by the variable resistors 62–65 in FIG. 1. An excitation signal (power and ground in FIG. 1) is applied to the strain gauge. Two of the resistors 62–63 define a voltage divider with an output 66 indicative of vertical displacement of the pointing device. The remaining resistors 64–65 define a voltage divider with an output 67 indicative of horizontal displacement of the pointing device. One may think of these resistors as comprising a potentiometer, since the usual result of displacement the pointing device is that one resistor increases its resistance and the other resistor decreases its resistance. As a general matter the result is that the potential measurable at the output is monotonically related to the displacement of the pointing device.

At this point the mechanical engineer's duties are completed and the electrical engineer must find a way (box 68 in FIG. 1) to process the two outputs, to convert them to digital values, and to make them available to software on digital data lines 73–74 for processing. In software the absolute position of the button 60 is converted to a velocity value, which in practical terms means that force is converted to speed of the cursor, a conversion that is well known to those in the art and plays no part in the present invention. The signal processing circuitry 68 will typically contain amplifiers and analog-to-digital converters such as amplifiers 69–70 and A/D converters 71–72.

The design of the signal processing circuitry is not easy. One enormous difficulty comes from the fact that the resistors 62–65 don't vary much in value in response to the user input at button 60. The voltage change detectable at 66 or 67 is quite subtle, on the order of 300 to 500 microvolts. This requires a high gain in the amplifiers 69–70. Another constraint is that the analog-to-digital converters (A/D converters) available for use by the engineer present a tradeoff of cost versus dynamic range. An eight-bit A/D converter is not very expensive, but a higher-resolution A/D converter is more expensive by at least an order of magnitude. This means that one must find a way to get by with an inexpensive A/D converter. But the dynamic range of the A/D converter is not very great, and the necessarily highly amplified signals from the high-gain amplifiers 69–70 are likely to swing beyond the end points of the input range of the A/D converters and into saturation at the power rails.

The hard times presented by having to do analog-to-digital conversions on small-amplitude signals lead to desperate measures. FIG. 2 shows one prior-art approach to the problem, in which only one of the two axes of the pointing device is shown for clarity. Line 78 carries the signal from voltage divider 62-63 to differential amplifier 80, where it is amplified and provided to analog-to-digital converter 71. When the first measurement is made (for example, upon power-up of the system), the system is powered up through switch 172 controllable by the microcontroller, and a programmable potentiometer 76 is used to "zero" the signal at 83 to the A/D converter. Potentiometer 76 is used with resistors 72, 122 and 123 to form a voltage divider which defines a Wheatstone bridge with voltage divider 62–63. Under control of microcontroller 81, the potentiometer 76 is adjusted to give a "zero" at the input to the A/D converter. The programmed setting of the potentiometer is noted and stored if necessary within the microcontroller 81.

It will be appreciated that the programmable potentiometer, together with its applied potentials, may be thought of as a digital-to-analog (D/A) converter. The microcontroller 81 is preferably a single-chip controller with a built-in A/D converter, but could more generally be any processor executing a suitable stored program.

The term "zero" in this context is in fact an arbitrary term, and in fact the potentiometer is used to cause the signal to the A/D converter to rest at some level that is convenient for measurement. In the system of FIG. 2 the output of the op amp swings between 0 and 5 volts, in which case the convenient value is about 2.5 volts, selected because the op amp is linear in that range and the dynamic range is centered about that value. Thus, 2.5 volts is rather arbitrarily defined as "zero" or "null" for purposes of the subsequent A/D conversion. At later times when it is desired to know the position of the pointing device, the switch 172 is again turned on, and vertical deflection of the button 60 changes the values of resistors 62–63. The changed voltage at 78 yields a difference with the potentiometer wiper voltage at 79, and thus a nonzero signal at 83. This signal is converted to digital data for line 82.

It will be appreciated that the arrangement of FIG. 2 does function. But it will be appreciated by those skilled in the art that the arrangement of FIG. 2 is but one of at least two signal processing channels. The total component count includes not one but two programmable potentiometers, as well as expensive and high-precision components (resistors, capacitors, and amplifiers) elsewhere in the channels.

It is desirable to have a signal processing system for strain-gauge pointing devices having a reduced parts count, and permitting the use of relatively inexpensive low-tolerance components. It is likewise desirable to have a signal processing system in which the components can process signals from two or three or more strain gauges, permitting additional inputs by users without a linear increase in the number of signal processing components.

SUMMARY OF THE INVENTION

A signal processing system for a strain-gauge pointing device has a reduced parts count and permits the use of relatively inexpensive low-tolerance components. The system can process signals from two or three or more strain gauges, permitting additional inputs by users without a linear increase in the number of signal processing components. The system employs an RC network to develop an offset for the signal to be provided to an analog-to-digital converter. The system performs each measurement twice, once with a particular excitation polarity and again with the opposite excitation polarity, which permits correction for drift and temperature instability.

DESCRIPTION OF THE DRAWING

The invention will be described with respect to a drawing in several figures, of which.

DETAILED DESCRIPTION

Figure 2:
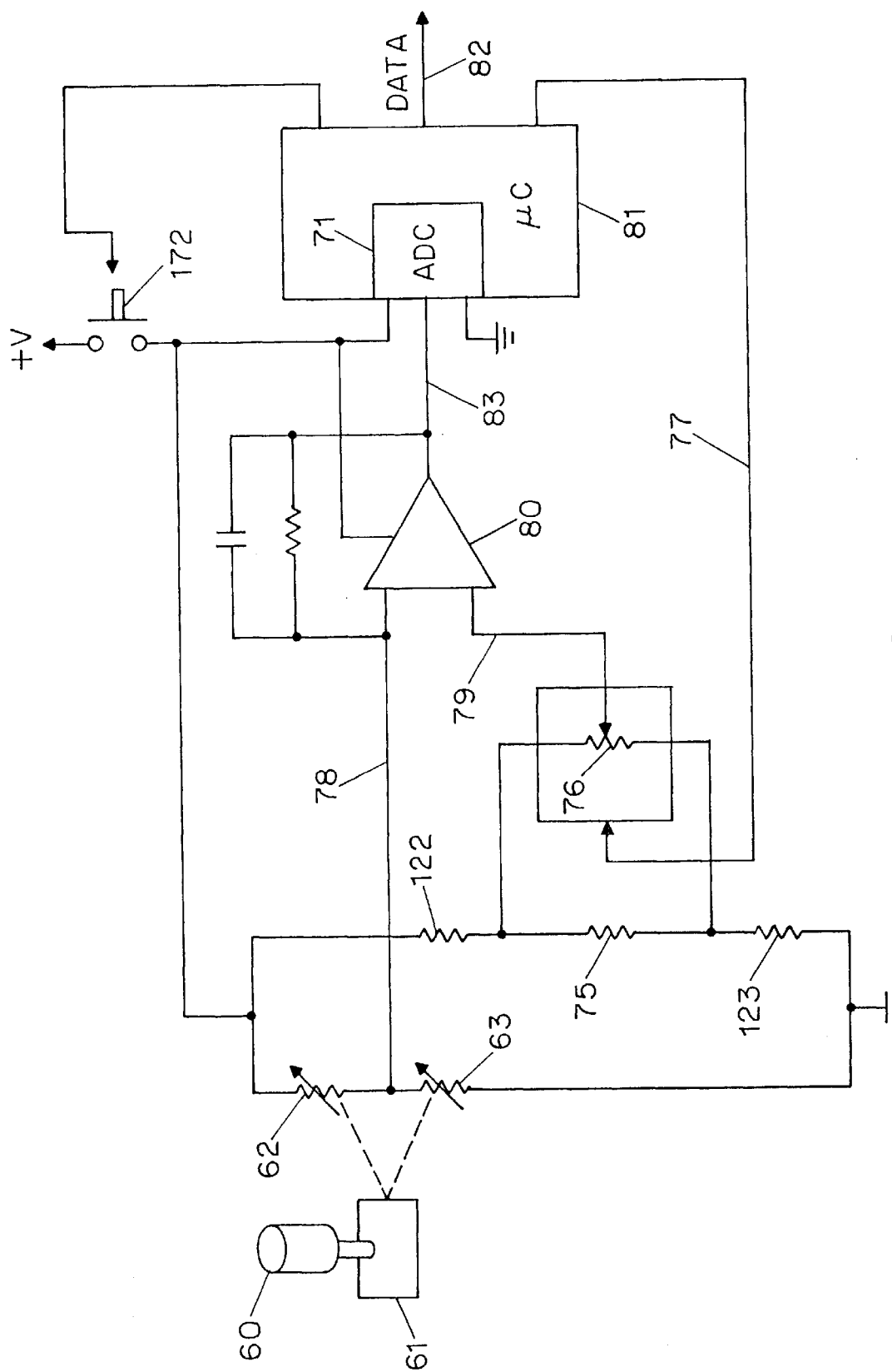
FIG. 2 shows in some detail the signal processing circuitry in a prior-art system.
Figure 3:
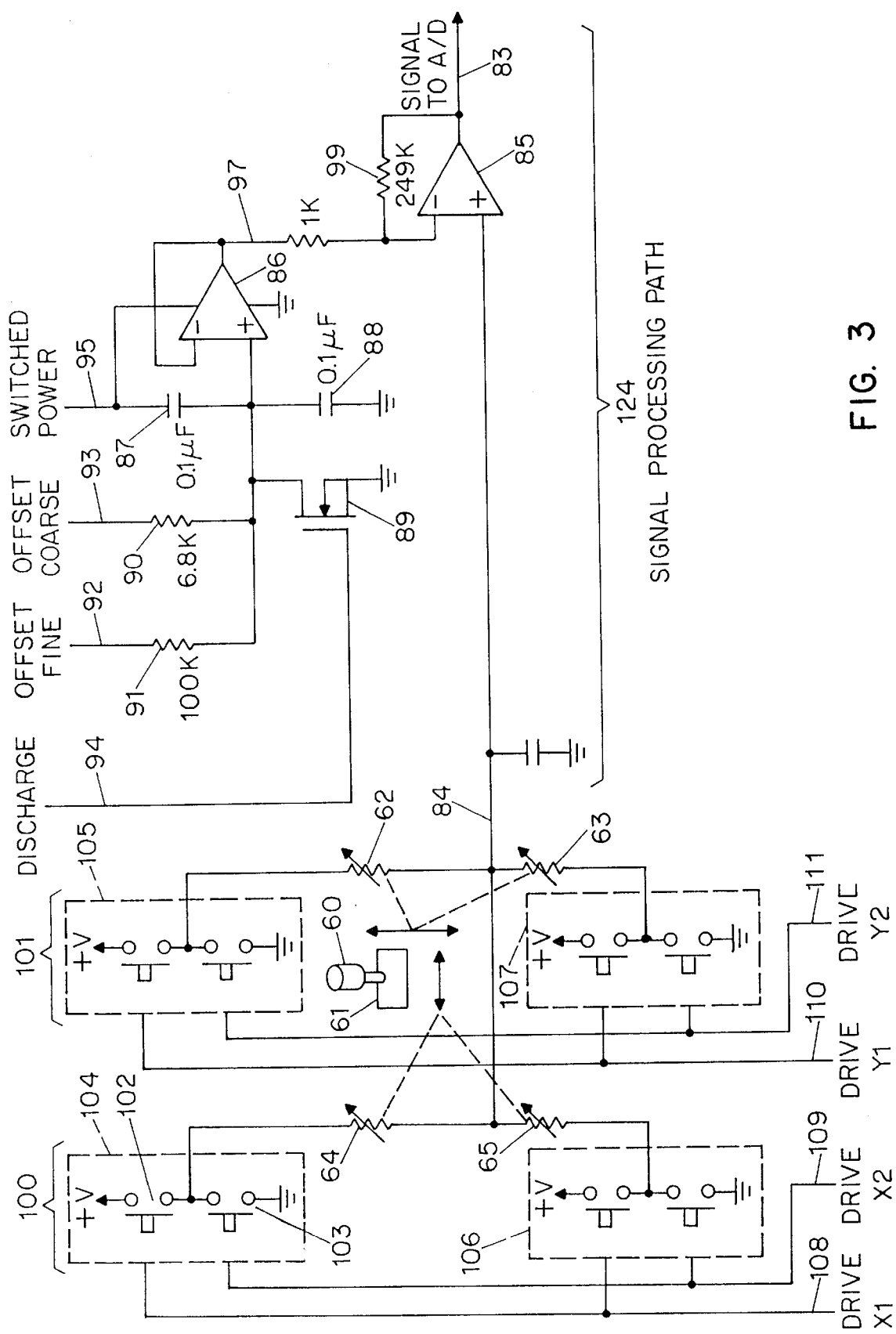
FIG. 3 shows in schematic form a signal processing circuit in accordance with the invention.

FIG. 3 shows an embodiment of a signal processing circuit in accordance with the invention. The output at 84 from a resistor voltage divider is amplified by high-gain amplifier 85 and provided at 83 to an analog-to-digital converter omitted for clarity in FIG. 3. (FIG. 2 shows how a microcontroller 81 with an A/D converter 71 might be employed to receive the signal at 83.) Again referring to FIG. 3, an offset is provided to bring the signal at 84 into the center of the dynamic range of the A/D converter and/or the center of the output range of the amplifier, and this is accomplished by capacitor network 87–88 and charging resistors 90–91 under control of the microcontroller as will now be described.

When the system is first powered up, the excitation signal is supplied to the voltage divider of the strain gauge and the developed analog signal at 84 is provided to the differential op amp 85. The other input to the amplifier 85 is from the offset circuitry just mentioned. The switched-power line 95 is grounded (by a push-pull driver omitted for clarity in FIG. 3) and the discharge FET 89 is switched on by discharge control line 94, again under control of the microcontroller. This bleeds off nearly all the charge on the capacitors 87–88. Then the discharge FET 89 is turned off, and the push-pull driver for the switched power line 95 is driven to operating voltage. Capacitors 87–88 quickly charge up and the voltage at 98 is about half of the operating voltage. A measurement is made at the A/D converter to determine whether the signal at 83 is null (zero). (It will be recalled from the earlier discussion that "null" means some arbitrary value in the center of the linear range of the system and in the center of the dynamic range of the system; the system of FIG. 3 swings between 0 and 5 volts so "null" is defined arbitrarily as 2.5 volts.) If the signal is at a null, then the offset-coarse line 93 is driven (by a tri-state driver, again omitted for clarity in FIG. 3) under microcontroller control to attempt to null the signal at 83. Coarse-adjust resistor 90 forms an RC network and the time constant determines what duration of coarse-offset signal is required to accomplish a desired potential at 98. The coarse adjustment can be upward; or downwards, and because the drivers are tri-state, the coarse adjustment and fine adjustment do not interfere with each other. The resistors 90–91 and capacitors 87–88 and the associated circuitry may be thought of as a digital-to-analog (D/A) converter, albeit not a converter with much linearity.

The clock speed of the microcontroller places a granularity on the duration of a coarse-adjust signal. For this reason, a second resistor 91 (defining a much longer time constant with respect to the capacitors) is provided. Under microprocessor control a fine-offset line 92 is driven by a tri-state driver to achieve a fine adjustment to the voltage at 98.

The voltage at 98 is isolated by unity-gain amplifier 86 and provided to the other of the two inputs of differential amplifier 85. After sufficient microcontroller current bursts through coarse and fine-adjust resistors 90–91, the voltage at 98 closely approximates that at 84 and the output 83 is null (zero) (or center of the dynamic range of the A/D converter and/or the amplifier).

After such nulling of the signal processing path, subsequent deflections of the button 60 give rise to changes in the signal 83 and are detected by the A/D converter and made available to software for processing as in the prior art.

The circuitry described thus far in FIG. 3 offers a substantial reduction in parts count and parts cost as compared with the prior-art approach of FIG. 2. An expensive and bulky programmable potentiometer has been replaced with less expensive and less bulky components. A further advantage is that the signal processing data path in the system according to the invention has a wide dynamic range in comparison to the system of FIG. 2, since the RC network that develops the offset has a wider range, electrically, than the potentiometer arrangement of FIG. 2.

Figure 1:
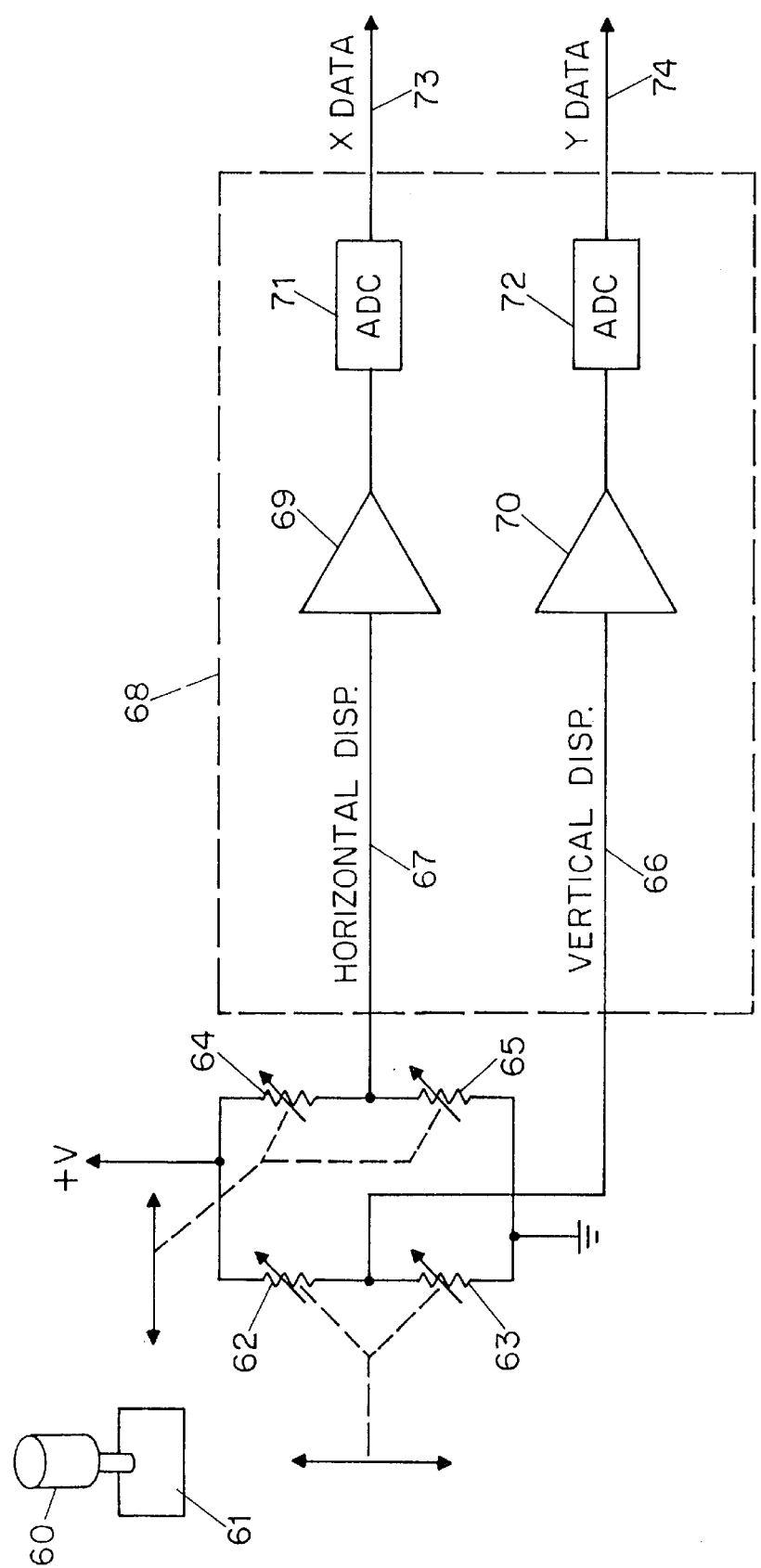
FIG. 1 is a prior-art generalized schematic of a strain-gauge pointing device.

Additional aspects of the system of FIG. 3 will now be described which point up further advantages over the prior art. It will be noted that the excitation signals for the strain gauge are applied through tri-state drivers 104–107. One consequence of the use of the drivers 104–107 is that the voltage divider 64–65 has an output that is tied directly to the output of voltage divider 62–63. This is in direct contrast to the prior-art approach of FIGS. 1 and 2 in which each voltage divider has its own distinct signal processing path, its own corresponding programmable potentiometer, and its own analog-to-digital converter. In the system of FIG. 3, it is possible to energize only drivers 104 and 106 (thus energizing axis channel 100) on the one hand, or to energize only drivers 105 and 107 (thus energizing axis channel 101). When one of the channels 100 or 101 receives its excitation, then the signal processing path 124 measures the deflection in that axis. In this way a single signal processing path 108 is able to collect data from a number of axes, and while the number of channels 100, 101 is shown as two, the system may be expanded to handle more channels in parallel with channels 100, 101 in FIG. 3. As a result, a substantial (nearly two to one or more) savings in component count and cost is enjoyed. Only one signal processing path 124 is needed and only one A/D converter (omitted for clarity in FIG. 3) is needed. It will be appreciated that the outputs of the drivers 104–107 are tristate, that is, that each source of excitation potential is capable of being set to a high impedance to permit some other voltage divider to be measured.

While the points made thus far show substantial advantages over the prior art, further advantages will be apparent to those skilled in the art, as will now be described. It will be noted that the drivers 104–107 are tri-state drivers, each containing switches 102–103 (shown in driver 104). These switches are an integral part of a typical microcontroller, which means that they do not contribute to the parts count, and thus do not contribute to assembly cost. The switches are controlled through the microcontroller by drive lines 108–111. An important capability may now be seen. It is possible, under microcontroller control, to excite each voltage divider with either of two polarities of excitation potential.

In an exemplary embodiment, upon power-up the X excitation 108 is provided, giving working voltage at the top of voltage divider 64–65 and ground at the bottom of the divider. The signal at 84 is indicative of the at-rest X position of the pointer button 60. The microprocessor zeroes the capacitors 87–88 by grounding 95 and energizing 94, and then applies bursts of current as needed at 93 and then 92 to integrate to a potential at 98 that nulls the signal at 84. Careful note is made, within the microcontroller, of the burst durations that were needed to develop the null. (Those skilled in the art will appreciate that it is desirable for the resistor 91 and the resistor 90 to have a ratio of slightly less than 16 to 1.)

Importantly, what happens next (under microcontroller control) is that the X excitation 108 is turned off and the X excitation 109 is now turned on. The voltage divider is now receiving an excitation signal of opposite magnitude. The signal at 84 is different now (except in the exceedingly unlikely event of the two resistors 64–65 being exactly equal in value) and a different set of burst durations at lines 92–93 is found to null the output at 83. These durations are also noted for later reference, and the difference in the (nearly zero) nulled outputs at 83 (in response to the two different excitation polarities from lines 108 and 109) is noted.

What has been described up to this point is the calibration upon power-up for one axis 100. The calibration is repeated for each other axis such as axis 101 in FIG. 3. For each axis, what is noted within the memory of the microcontroller are the following three numbers: the burst duration that (nearly) nulled the signal with one excitation polarity (call this A), the burst duration that (nearly nulled the signal with the other excitation polarity (call this B), and the difference between the two (near) nulls (call this C).

In the time after power-up, when the pointing device is being used, it is necessary from time to time to measure the pointing device deflection. The exemplary procedure for this measurement is as follows. First, the excitation 108 is turned on. The offset circuitry is programmed with bursts as defined by A. The output at 83 is measured (call this D). Then the excitation 109 is turned on. The offset circuitry is programmed with bursts as defined by B. The output at 83 is measured (call this E). Then the difference between these two readings is calculated in the microcontroller (this is D-E). Finally the difference between the two near-nulls that was determined during initialization (C) is subtracted. The result is a number indicative of the button displacement. Expressed as a formula the result is ((D-E)-C).

Those skilled in the art will appreciate that the procedure just described, which involves using two polarities of excitation during setup and two polarities of excitation during measurement, permits the use of relatively inexpensive electronic components in the signal processing data path. Drift, poor tolerance, and many other factors that might otherwise lead to systematic error in measurement of the button deflection are corrected and eliminated.

It might be thought that the need to do two excitations and A/D measurements for each position measurement would take too long. But actual testing shows that with inexpensive 8-bit A/D converters and other components, and with modest clock speed for the microcontroller, it is possible to perform a single data collection in under 250 microseconds, and thus the two measurements for a single axis in double that time, or under 500 microseconds.

In one embodiment of the invention, it is desirable to have a ratio of slightly less than sixteen to one for the values of the resistors 90 and 91. The reason for this will be clear to those skilled in the art, namely that the current burst durations for the two resistors may then be expressed in binary and the bit patterns concatenated. The high-order four bits of an eight-bit byte can convey the burst duration for the coarse adjust time interval through resistor 90, while the low-order four bits of the byte can convey the current burst duration for the fine adjust time interval through resistor 91. Importantly, there is no requirement that the ratio of the resistors be exactly sixteen to one. What is needed is that the offset potential developed in the capacitors 87–88 be repeatable (and without large gaps) with respect to the digital input. During the power-up initialization, the offset potential is derived through successive approximations, while during subsequent measurements the offset potential is simply developed as quickly as possible. The coarse offset current burst might typically have a duration of zero to sixteen microseconds (a granularity determined by the clock rate of the microcontroller) and the fine offset current burst might likewise have a duration of zero to sixteen microseconds. The two bursts may be performed one after the other (which only takes 32 microseconds in this example) or, if time were critical, the bursts could be overlapping in time, for example, by charging the capacitors through the two resistors simultaneously for part of the time. Stated differently, if the ratio is slightly less than sixteen to one, then there is no danger that the effect resulting from a single time unit with the coarse adjust resistor will exceed the effect resulting from a full sixteen time units with the fine adjust resistor.

Figure 4:
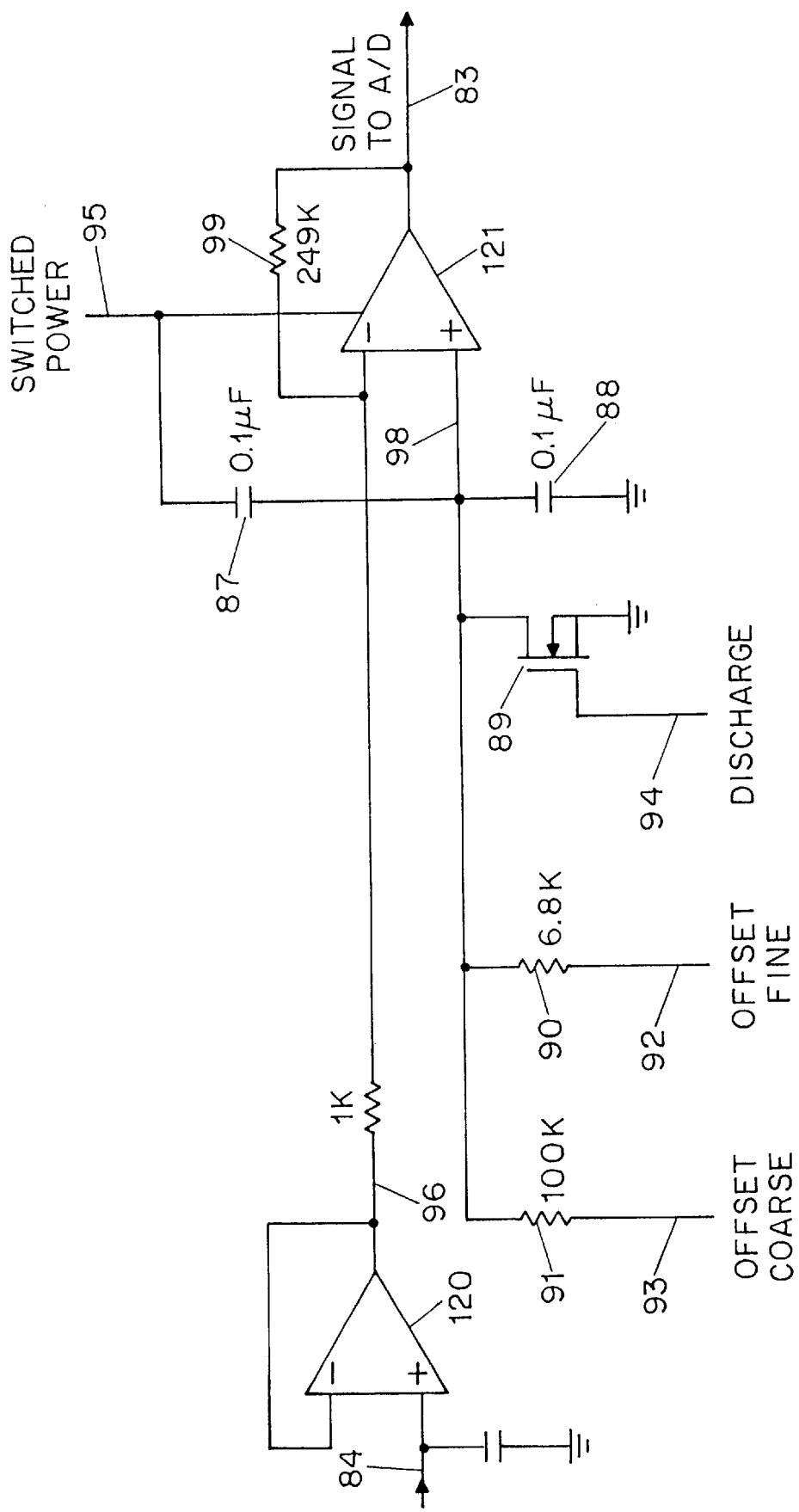
FIG. 4 shows in schematic form a signal processing circuit in accordance with a second embodiment of the invention.

In another embodiment, it is considered desirable to have more than eight bits of D/A, for example about nine bits. In this case, there may be five bits of coarse adjustment and another five bits of fine adjustment, concatenated to form a ten-bit integer with a theoretical 1024 steps. In practice the actual number of steps giving rise to useful analog outputs will be somewhere between 512 and 1024 steps. The ten-bit integer is stored in a sixteen-bit word. In this embodiment the ratio of the resistors is slightly less than 32. FIG. 4 shows an alternative embodiment of the system according to the invention. The offset and amplifier section 108 of FIG. 3 is replaced with the circuitry of FIG. 4 in this embodiment. Two operational amplifiers are used, just as in FIG. 3, but their sequence is reversed. The voltage divider output 84 passes through unity-gain amplifier 120 for isolation and then to an input of differential amplifier 121. The offset potential developed within capacitors 87, 88 is applied to the other input of differential amplifier 121. Amplifier 121 thus provides both a numerical subtraction of its two inputs and also provides the high gain required to amplify the small signal at 84 for the A/D converter (omitted for clarity in FIG. 4).

While the invention is described in connection with a pointing device, those skilled in the art will appreciate that the signal processing system described herein is applicable to many other applications. Any other application using a strain gauge, for example a scale, can use the signal processing system described herein with the same benefits including the ability to use inexpensive parts instead of high-tolerance parts, and the ability to minimize the parts count.

Those skilled in the art will have no difficulty devising obvious variations of the above-described invention, all of which are encompassed by invention as defined in the claims which follow.

What is claimed is:

1. A pointing device comprising:
   a processor;
   a first voltage divider having first and second ends and having an output the potential of which is monotonically related to applied force in a first axis of the pointing device;
   a first source of excitation potential connected to the first voltage divider and switchable between first and second polarities thereof under control of the processor;
   a second voltage divider having first and second ends and having an output the potential of which is monotonically related to applied force in a second axis of the pointing device;
   a second source of excitation potential connected to the first voltage divider and switchable between first and second polarities thereof under control of the processor;
   the first and second sources of excitation potential each capable of being switched to a high-impedence state;
   a digital-to-analog converter controlled by the processor and having an analog output;
   an analog-to-digital converter receiving as its input signals indicative of the first voltage divider output, the second voltage divider output, and the digital-to-analog converter output.

2. A method of measuring the position of a pointing device in two axes, the pointing device of a type having a first voltage divider having first and second ends and having an output the potential of which is monotonically related to applied force in a first axis of the pointing device, the pointing device further having a second voltage divider having first and second ends and having an output the potential of which is monotonically related to applied force in a second axis of the pointing device, the pointing device further having a digital-to-analog converter having an analog output, the pointing device further having an analog-to-digital converter receiving as its input signals indicative of the first voltage divider output, the second voltage divider output, and the digital-to-analog converter output, said method comprising the steps first initializing, first measuring, second initializing, and second measuring:
   the first initializing step comprising the steps of:
      applying an excitation potential of a first polarity to the first voltage divider and applying no potential to the second voltage divider;
      causing the digital-to-analog converter to have an output such that the input signal to the analog-to-digital converter is within its dynamic range, defining a first potential as the potential measured by the analog-to-digital converter, and defining a first digital value as the input to the digital-to-analog converter;
      applying an excitation potential of a second polarity to the first voltage divider and applying no potential to the second voltage divider;
      causing the digital-to-analog converter to have an output such that the input signal to the analog-to-digital converter is within its dynamic range, defining a second potential as the potential measured by the analog-to-digital converter, and defining a second digital value as the input to the digital-to-analog converter;
   the first measuring step comprising the steps of:
      applying the excitation potential of the first polarity to the first voltage divider and applying no potential to the second voltage divider;
      providing the first digital value to the digital-to-analog converter, and defining a third potential as the potential measured by the analog-to-digital converter;
      applying the excitation potential of the second polarity to the first voltage divider and applying no potential to the second voltage divider;
      providing the second digital value to the digital-to-analog converter, and defining a fourth potential as the potential measured by the analog-to-digital converter;
   the second initializing step comprising the steps of:
      applying an excitation potential of a first polarity to the second voltage divider and applying no potential to the first voltage divider;
      causing the digital-to-analog converter to have an output such that the input signal to the analog-to-digital converter is within its dynamic range, defining a fifth potential as the potential measured by the analog-to-digital converter, and defining a third digital value as the input to the digital-to-analog converter;
      applying an excitation potential of a second polarity to the second voltage divider and applying no potential to the first voltage divider;
      causing the digital-to-analog converter to have an output such that the input signal to the analog-to-digital converter is within its dynamic range, defining a sixth potential as the potential measured by the analog-to-digital converter, and defining a fourth digital value as the input to the digital-to-analog converter;
   the second measuring step comprising the steps of:
      applying the excitation potential of the first polarity to the second voltage divider and applying no potential to the first voltage divider;
      providing the third digital value to the digital-to-analog converter, and defining a seventh potential as the potential measured by the analog-to-digital converter;
      applying the excitation potential of the second polarity to the second voltage divider and applying no potential to the first voltage divider;
      providing the fourth digital value to the digital-to-analog converter, and defining an eighth potential as the potential measured by the analog-to-digital converter;
      evaluating a function of the first, second, third, and fourth potentials, the output of the function indicative of the applied force on the device in the first axis; and evaluating a function of the fifth, sixth, seventh, and eighth potentials, the output of the function indicative of the applied force on the device in the second axis.

3. A signal processing system comprising:
a processor;
a first voltage divider having first and second ends and having an output the potential of which is monotonically related to a first physical value;
a first source of excitation potential connected to the first voltage divider and switchable between first and second polarities thereof under control of the processor;
a second voltage divider having first and second ends and having an output the potential of which is monotonically related to a second physical value;
a second source of excitation potential connected to the first voltage divider and switchable between first and second polarities thereof under control of the processor;
the first and second sources of excitation potential each capable of being switched to a high-impedence state;
a digital-to-analog converter controlled by the processor and having an analog output;
an analog-to-digital converter receiving as its input signals indicative of the first voltage divider output, the second voltage divider output, and the digital-to-analog converter output.

4. A method of measuring first and second physical values using a sensor of the type having a first voltage divider having first and second ends and having an output the potential of which is monotonically related to the first physical value, the device further having a second voltage divider having first and second ends and having an output the potential of which is monotonically related to the second physical value, the device further having a digital-to-analog converter having an analog output, the device further having an analog-to-digital converter receiving as its input signals indicative of the first voltage divider output, the second voltage divider output, and the digital-to-analog converter output, said method comprising the steps first initializing, first measuring, second initializing, and second measuring:
the first initializing step comprising the steps of:
applying an excitation potential of a first polarity to the first voltage divider and applying no potential to the second voltage divider;
causing the digital-to-analog converter to have an output such that the input signal to the analog-to-digital converter is within its dynamic range, defining a first potential as the potential measured by the analog-to-digital converter, and defining a first digital value as the input to the digital-to-analog converter;
applying an excitation potential of a second polarity to the first voltage divider and applying no potential to the second voltage divider;
causing the digital-to-analog converter to have an output such that the input signal to the analog-to-digital converter is within its dynamic range, defining a second potential as the potential measured by the analog-to-digital converter, and defining a second digital value as the input to the digital-to-analog converter;
the first measuring step comprising the steps of:
applying the excitation potential of the first polarity to the first voltage divider and applying no potential to the second voltage divider;
providing the first digital value to the digital-to-analog converter, and defining a third potential as the potential measured by the analog-to-digital converter;
applying the excitation potential of the second polarity to the first voltage divider and applying no potential to the second voltage divider;
providing the second digital value to the digital-to-analog converter, and defining a fourth potential as the potential measured by the analog-to-digital converter;
the second initializing step comprising the steps of:
applying an excitation potential of a first polarity to the second voltage divider and applying no potential to the first voltage divider;
causing the digital-to-analog converter to have an output such that the input signal to the analog-to-digital converter is within its dynamic range, defining a fifth potential as the potential measured by the analog-to-digital converter, and defining a third digital value as the input to the digital-to-analog converter;
applying an excitation potential of a second polarity to the second voltage divider and applying no potential to the first voltage divider;
causing the digital-to-analog converter to have an output such that the input signal to the analog-to-digital converter is within its dynamic range, defining a sixth potential as the potential measured by the analog-to-digital converter, and defining a fourth digital value as the input to the digital-to-analog converter;
the second measuring step comprising the steps of:
applying the excitation potential of the first polarity to the second voltage divider and applying no potential to the first voltage divider;
providing the third digital value to the digital-to-analog converter, and defining a seventh potential as the potential measured by the analog-to-digital converter;
applying the excitation potential of the second polarity to the second voltage divider and applying no potential to the first voltage divider;
providing the fourth digital value to the digital-to-analog converter, and defining an eighth potential as the potential measured by the analog-to-digital converter;
evaluating a function of the first, second, third, and fourth potentials, the output of the function indicative of the first physical value; and
evaluating a function of the fifth, sixth, seventh, and eighth potentials, the output of the function indicative of the second physical value.

* * * * *